United States Patent [19]

May

[11] Patent Number: 5,015,085

[45] Date of Patent: May 14, 1991

[54] FLOATABLE RETAINER FOR EYEGLASSES

[76] Inventor: David G. May, 28 Windsor Dr., Little Rock, Ark. 72209

[21] Appl. No.: 432,619

[22] Filed: Nov. 6, 1989

[51] Int. Cl.$^5$ .......................... G02C 1/00; G02C 3/00
[52] U.S. Cl. ..................................... 351/43; 351/156; 351/157
[58] Field of Search ................. 351/156, 157, 123, 43; 2/13, 452; 24/3 C

[56] References Cited

U.S. PATENT DOCUMENTS

| | | | |
|---|---|---|---|
| 2,660,092 | 11/1953 | Bloom | 351/156 |
| 3,874,776 | 4/1975 | Seron | 351/156 |
| 4,133,604 | 1/1979 | Fuller | 351/156 |

Primary Examiner—Rodney B. Bovernick
Attorney, Agent, or Firm—Stephen D. Carver

[57] ABSTRACT

A floatable eyeglass retainer comprising an elongated, solid cord that is covered with tubular fabric. The cord is made of a buoyant material, which is also flexible. An oval shaped piece of resilient material is fastened directly to each end of the cord by use of a clamp. Covering each clamp is a small piece of tubing made of a buoyant material. A resilient spacer is slipped onto both ovals forming a small opening in which the temple of a pair of eyeglasses is force fed into, keeping the retainer in place on the eyeglasses.

8 Claims, 1 Drawing Sheet

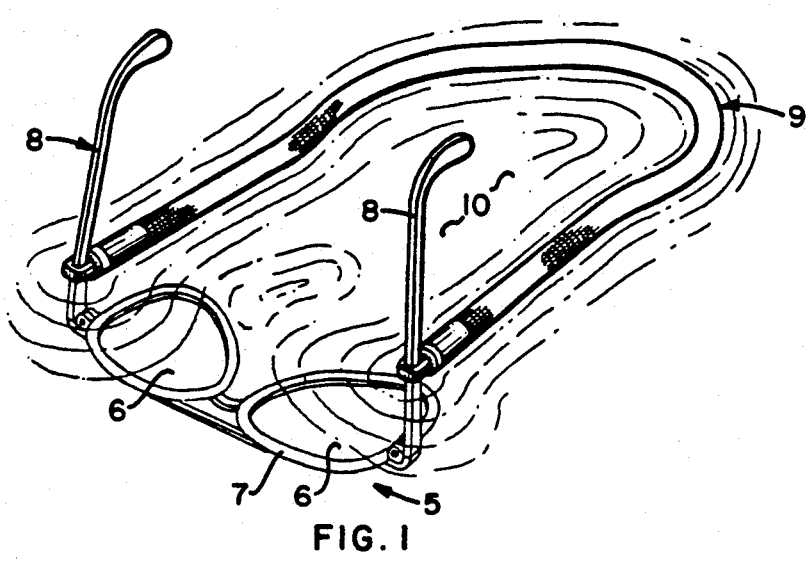
FIG. 1
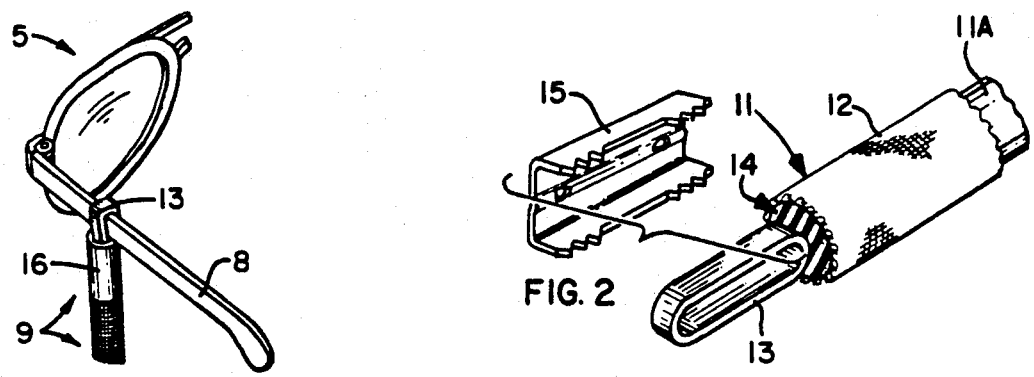
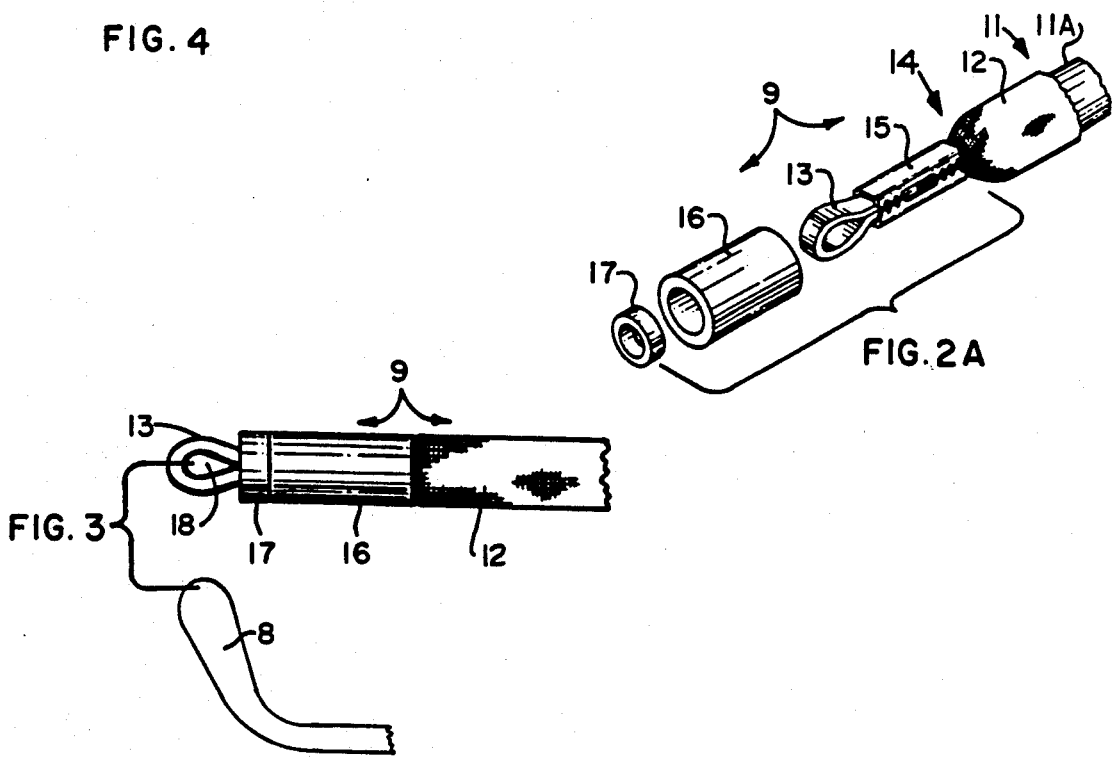

FLOATABLE RETAINER FOR EYEGLASSES

BACKGROUND OF THE INVENTION

1. Field of Invention

The present invention relates to objects designed to keep a pair of eyeglasses afloat in the event they are accidentally dropped into water. It also relates to devices designed to enable easy removal or application of eyeglasses, while also providing retention of the eyeglasses on the wearer's chest between periods of use.

2. State of the Prior Art

Various types of floats for eyeglasses, or floatable eyeglasses themselves, have been advanced which keep the eyeglasses afloat in the event they are dropped into water. Also various types of retainers have been advanced which retain the eyeglasses on the wearers chest when not in use. Both of these type devices work well for their purposes, but none of them combine a primary purpose of flotation, with a secondary purpose of retention.

U.S. Pat. No. 3,711,190 illustrates a float for spectacles which is a blow molded air cell, having molded loops which are threaded on the temples of a pair of spectacles. Similar devices are illustrated in U.S. Pat. Nos. 3,038,375 and 3,390,938.

U.S. Pat. Nos. 3,740,124 and 3,517,989 illustrate floatable spectacles.

U.S. Pat. No. 4,133,604 illustrates a head band comprising an elastomeric, fabric covered stretch band made adjustable by sliding the temple pieces of eyeglasses into tubular members formed from the end portions of a flat band. This head bands primary purpose is to retain the eyeglasses to the wearers head, when in use. Secondary purposes utilized by the head band are for neck retention when not in use and as a flotation device in case the eyeglasses are dropped into a body of water.

U.S. Pat. No. 2,481,946 illustrates a neck retainer for spectacles having a small tubular member attached to a fabric strap which fits around the neck, and holds the glasses on the chest of the wearer when not in use.

U.S. Pat. No. 4,541,696 illustrates an eyeglass retainer comprising a tubular elastic knit cord made adjustable by sliding the temple pieces of eyeglasses into the tubular ends of the cord.

BRIEF SUMMARY OF THE INVENTION

The present invention is an eyeglass retainer primarily used for floating eyeglasses in the event they are dropped into a body of water. However, the device may be utilized to retain the glasses in place around the wearers neck when the glasses are not in use.

The device comprises an elongated, solid cord. The cord is made from a flexible, buoyant material. This cord is covered with tubular fabric. Two resilient ovals are crimped directly to each end of the cord by clamps. Slipped onto each of the clamps is a small tubular piece of buoyant material. A small resilient spacer is then slipped onto each oval which forms a small opening in which the temple of the eyeglasses are force fed into, forming a snug fit on the temple. However, these spacers may be removed in the event wide templed eyeglasses are used, utilizing the original pair of ovals to slip the wide temples of the eyeglasses into.

BRIEF DESCRIPTION OF THE DRAWINGS

FIG. 1 is a perspective view illustrating eyeglasses afloat by means of a retainer made according to the present invention.

FIGS. 2 and 2A are enlarged perspective views showing the assembly of the floatable eyeglass retainer with portions thereof removed for clarity.

FIG. 3 is an enlarged side elevational view of one end of the floatable eyeglass retainer made according to the present invention.

FIG. 4 is a perspective view of one end of the floatable eyeglass retainer being fastened to a wide templed pair of eyeglasses, the other end being a mirror image thereof as represented in FIG. 1.

DETAILED DESCRIPTION OF THE DRAWINGS

Referring to FIG. 1, a pair of eyeglasses as shown generally at 5 has lenses 6, a main frame 7 for the lenses, and bow pieces or temples, indicated at 8, attached to the main frame of the eyeglasses by hinges in the normal manner. A floatable eyeglass retainer made according to the present invention illustrated generally at 9 is slipped on the temple pieces 8 of the eyeglasses. The eyeglasses are shown floating in water illustrated generally at 10.

Referring to FIGS. 2 and 2A, these illustrate enlarged perspective views showing the assembly of one end of the floatable eyeglass retainer. The retainer preferably comprises an elongated, flexible cord 11. The cord 11 also comprises a buoyant elongated, solid rod 11A which is also flexible. The cord also comprises an outer tubular fabric covering 12. Buoyant materials for such cord 11 are closed cell neoprene foam or closed microcellular cross link polyethylene foam. Still other suitable materials for the invention will become evident and is not limited to the before mentioned material.

Referring to FIG. 2, at each end of the cord 11 a resilient oval 13 is attached directly to the cords end 14 and to the tubular fabric 12, by use of a clamp 15.

Referring to FIG. 2A, the clamp 15 should be affixed whereas approximately one-half of the resilient oval 13 is left out of the clamp 15, as shown only in FIG. 2A. After each clamp 15 is affixed to the cord 11 and tubular fabric 12, a small tubular piece of buoyant material 16 is slipped over the resilient oval 13 and onto the clamp 15. A small resilient spacer 17 is then slipped onto each oval 13.

Referring to FIG. 3, shown is an enlarged side elevational view of one end of the floatable eyeglass retainer, shown generally at 9. After the small resilient spacer 17 is slipped onto each resilient oval 13 a small opening 18 is formed in which the temple piece 8 of the eyeglasses is force fed into.

Turning now to FIG. 4, illustrated is a perspective view of a pair of eyeglasses, shown generally at 5, with a wide temple piece 8. Attached to the eyeglasses temple 8 is one end of the floatable eyeglass retainer, shown generally at 9. The eyeglass retainer is excluding the small resilient spacer 17, shown in FIGS. 2A and 3, in order that the opening formed by the resilient oval 13 can accept the wide temple 8 of the eyeglasses.

I claim:

1. A retainer for holding and floating eyeglasses, said retainer comprising:
   an elongated, flexible cord having a pair of opposing ends, said cord comprising an inner, solid and flexible buoyant rod for floating said eyeglasses and an outer, tubular covering coaxially surrounding said rod for strengthening said cord;

a pair of resilient ovals for engaging said eyeglasses, one oval attached to each of said cord ends;

clamp means for securing said ovals to said cord ends by engaging both the ends of said rod and the ends of said tubular covering with an exposed end of said ovals emerging from said clamp means; and, tube means for coaxially covering said clamp means and at least a portion of said exposed end of said ovals, said tube means defining a small orifice in said ovals for resiliently grasping the temples of said eyeglasses so that said cord holds said eyeglasses.

2. The combination as defined in claim 1 wherein said retainer comprises removable resilient tubular spacer means coaxially disposed about said oval adjacent said tube means for further restricting said orifice to accommodate narrower temple pieces of eyeglasses.

3. The combination as defined in claim 2 wherein said tube means and said spacer means are made of buoyant material.

4. A retainer for holding and floating eyeglasses, said retainer comprising:

an elongated, flexible, durable cord having a pair of opposing ends, said cord comprising:

an inner, flexible, solid buoyant rod for floating said eyeglasses, said rod comprised of low density foam; and, an outer, seamless, tubular fabric covering which coaxially surrounds said rod for strengthening and coloring said cord; and, fastener means associated with said cord at each of said opposing ends for engaging the temple pieces of said eyeglasses, so that said retainer holds said eyeglasses.

5. The combination as defined in claim 4 wherein said fastener means comprises resilient oval means for engaging said temple pieces, and clamp means for securing said oval means to said cord ends with an exposed end of said oval means emerging from said clamp means and having an orifice for resiliently receiving the temples of said eyeglasses so that said cord holds said eyeglasses.

6. The combination as defined in claim 5 wherein said retainer comprises tube means for coaxially covering said clamp means and at least a portion of said exposed end of said oval means, said tube means bordering said orifice and operable to frictionally contact the temple piece of said eyeglasses to securely grip same.

7. The combination as defined in claim 6 wherein said retainer comprises removable, resilient tubular spacer means coaxially disposed about said oval means adjacent said tube means for further restricting said orifice to accommodate narrower temple pieces of eyeglasses.

8. The combination as defined in claim 7 wherein said means and said spacer means are made of buoyant material.

* * * * *